Aug. 28, 1956  F. W. STUKENBORG ET AL  2,760,324
METHOD OF COTTON HARVESTING
Original Filed Aug. 13, 1949                4 Sheets-Sheet 1
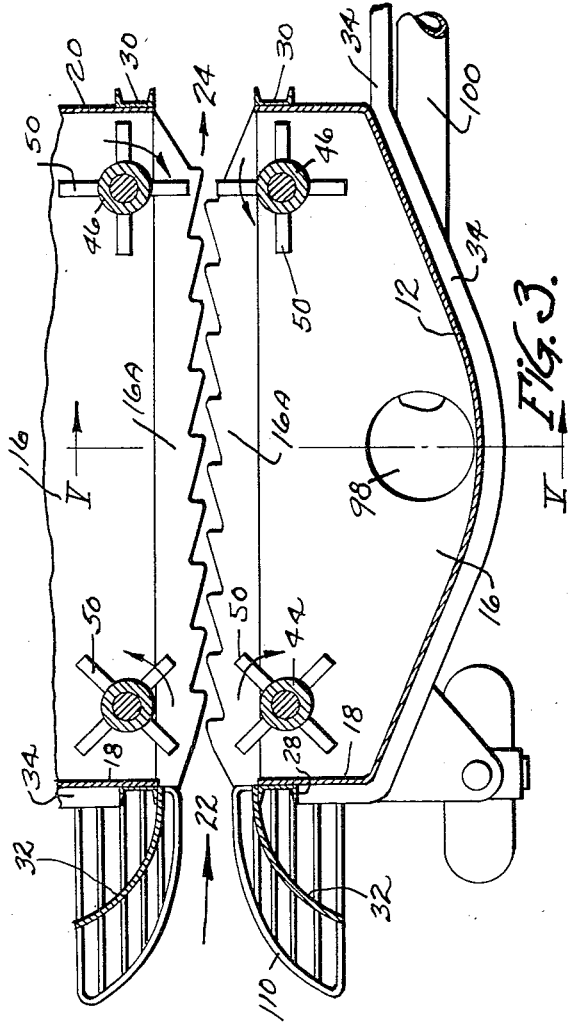
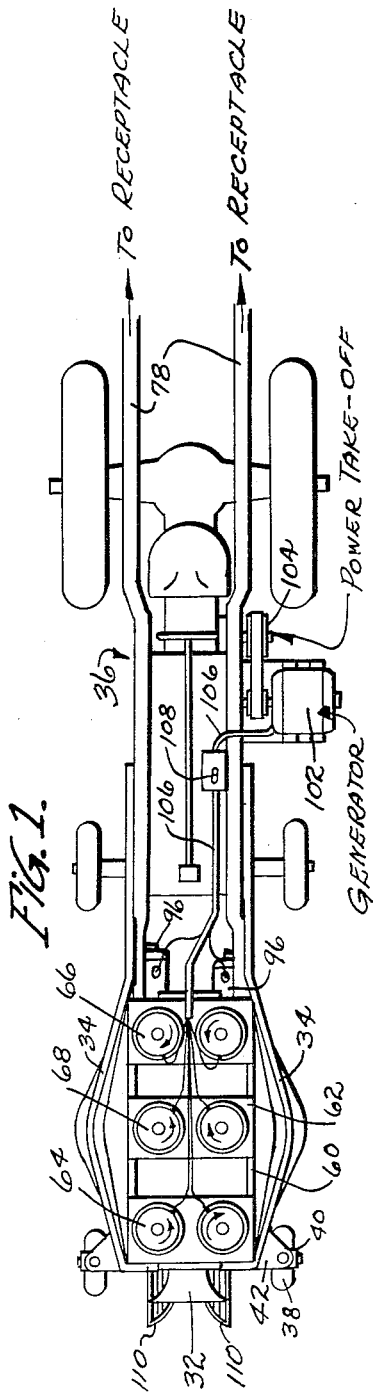
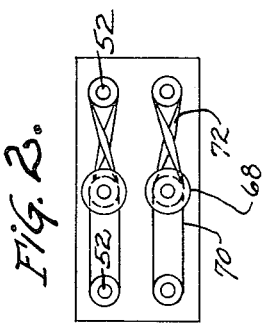
Inventors
FREDERICK W. STUKENBORG
LOUIS C. STUKENBORG
By Weatherford & Weatherford
Attorneys Aug. 28, 1956  F. W. STUKENBORG ET AL  2,760,324
METHOD OF COTTON HARVESTING
Original Filed Aug. 13, 1949  4 Sheets-Sheet 2
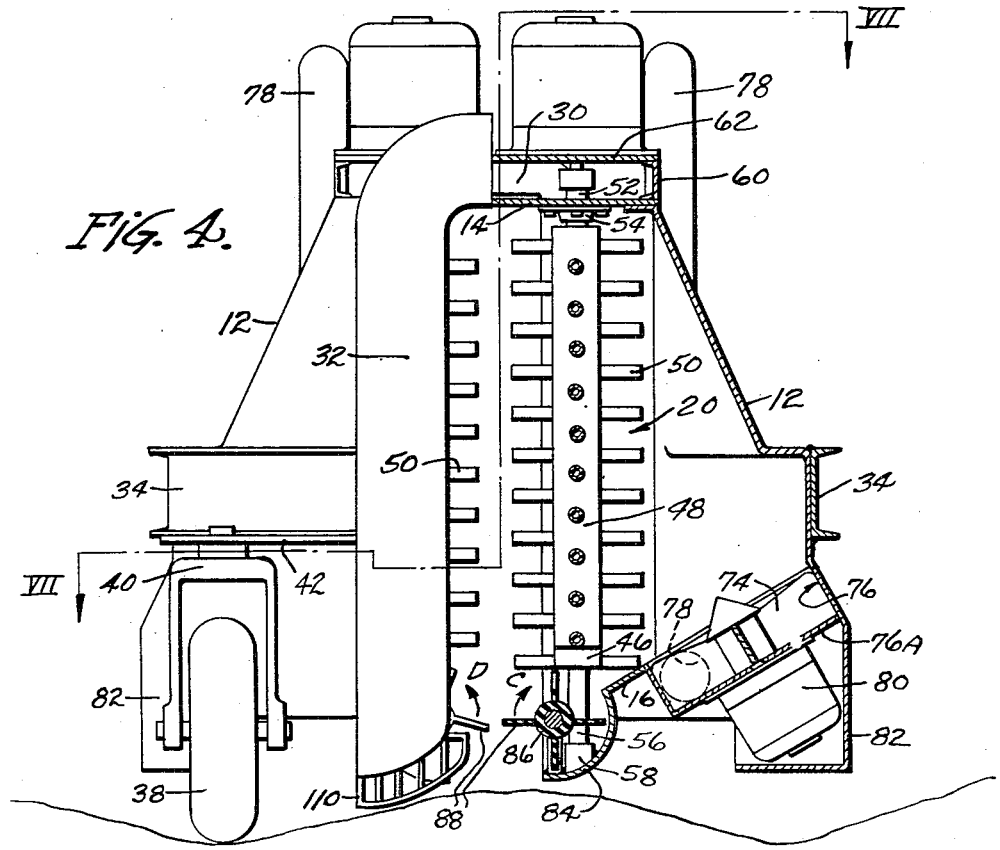
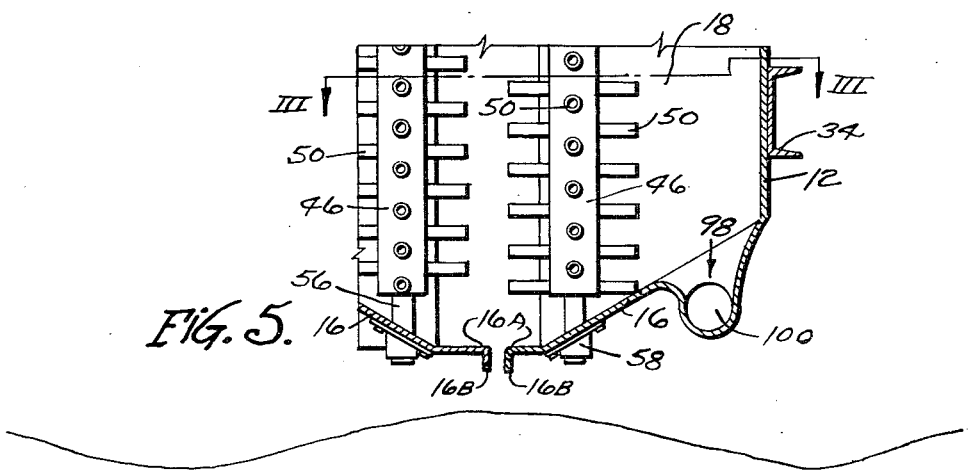
Inventors
FREDERICK W. STUKENBORG
LOUIS C. STUKENBORG
By Weatherford & Weatherford
Attorneys

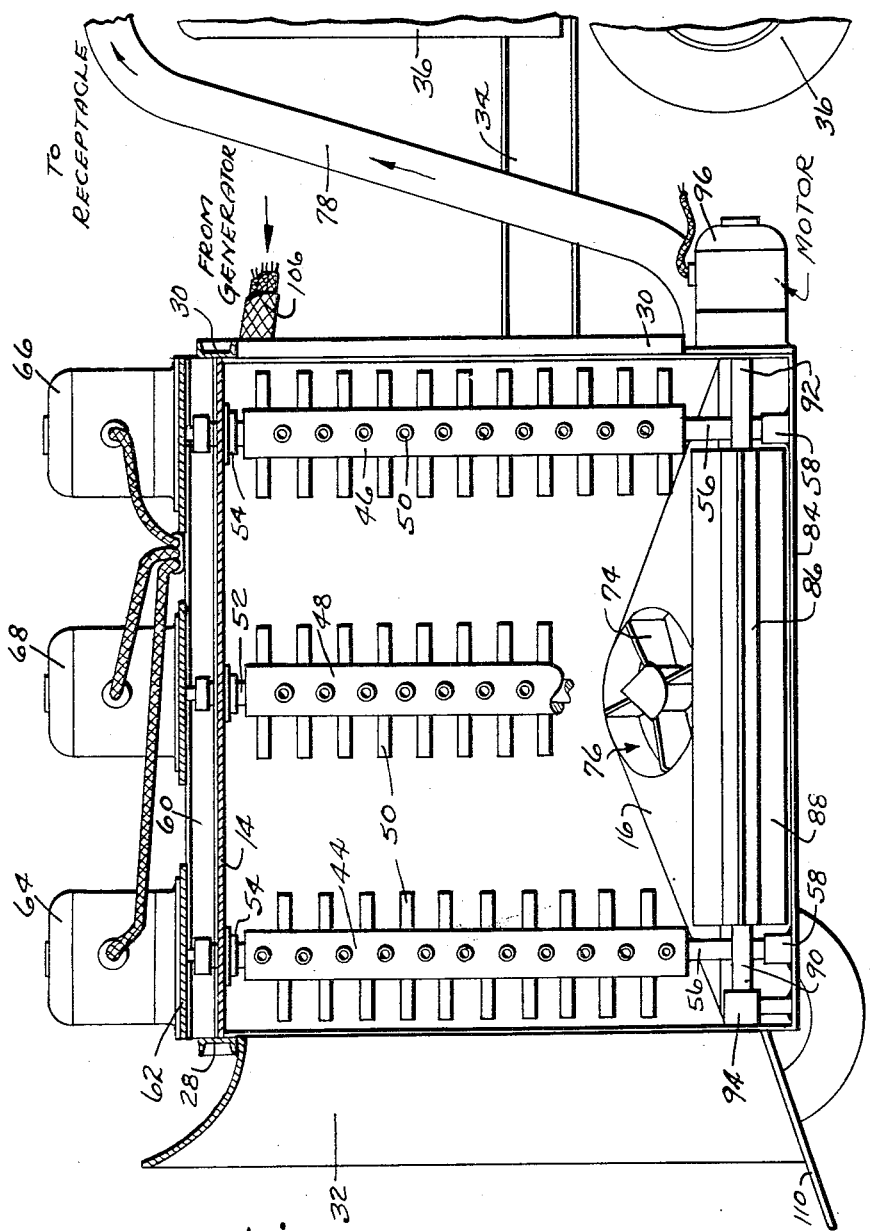

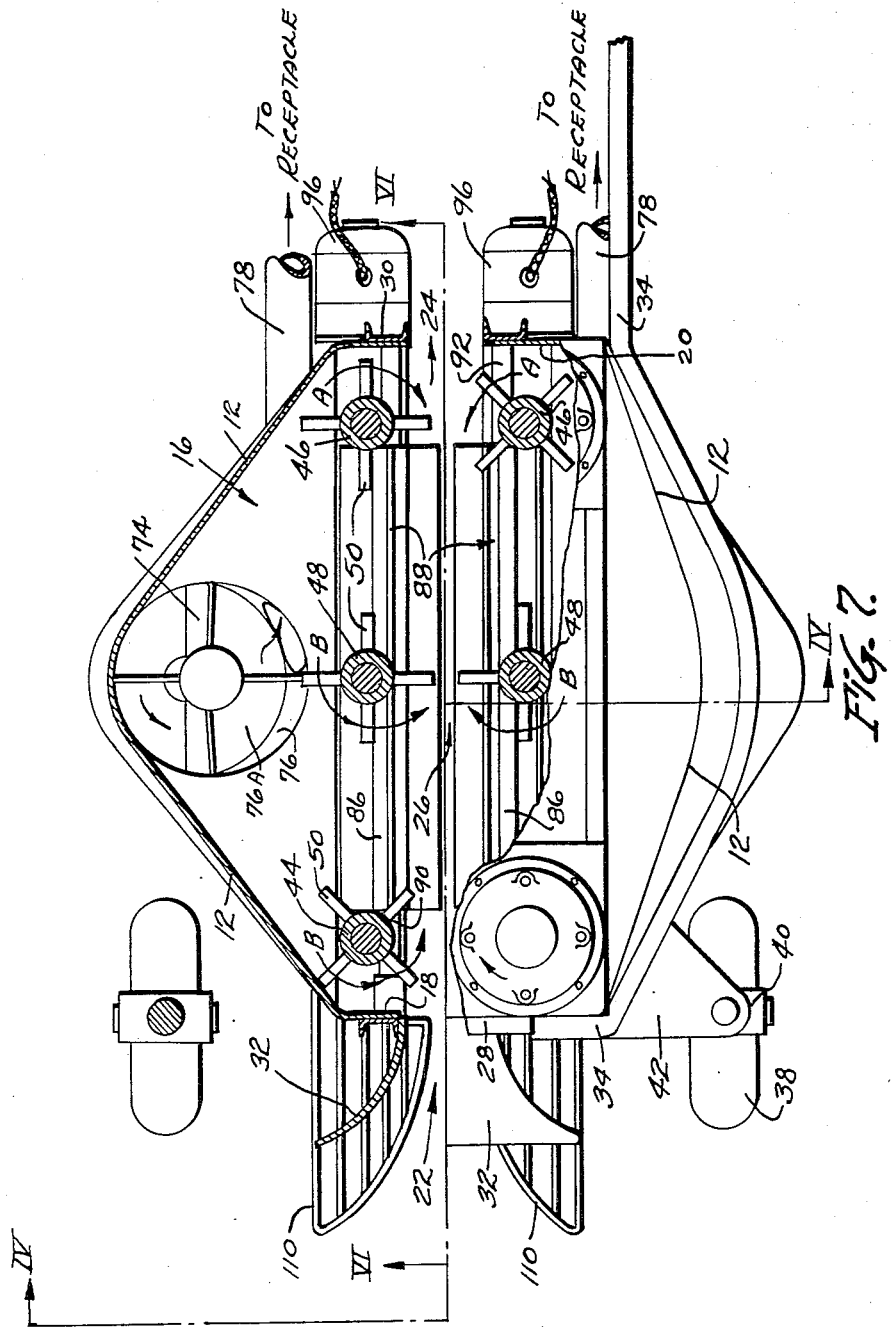

United States Patent Office 2,760,324
Patented Aug. 28, 1956

2,760,324
METHOD OF COTTON HARVESTING

Frederick W. Stukenborg, Atlanta, Ga., and Louis C. Stukenborg, Memphis, Tenn.

Original application August 13, 1949, Serial No. 110,146, now Patent No. 2,674,078, dated April 6, 1954. Divided and this application April 5, 1954, Serial No. 420,936

5 Claims. (Cl. 56—11)

This application is a division of our co-pending application, Serial No. 110,146, filed August 13, 1949, now Patent No. 2,674,078.

This invention relates to a method of harvesting cotton, and particularly to a harvesting method in which the cotton is removed from the bolls by mass effort as distinguished from hand or machine picking or gathering, in which the cotton of each boll is individually contacted and withdrawn from the boll.

It further relates to a harvesting method which is adapted for use on cotton which has been defoliated and is fully ripe and in which the loosening and removing of the cotton from the bolls is possible without individual effort on each thereof.

It especially relates to a harvesting method in which the cotton is dislodged by agitation and beating, in the presence of a vacuum current of air by which the cotton is collected, withdrawn and delivered to a suitable receptacle.

Cotton varies widely in plant conditions and growth, from small wiry plants to large rank growths. All of the plants in the early season are covered by a growth of leaves which later die and drop off. In rank heavy plants this is usually accelerated by use of defoliating chemicals which cause the leaves to fall, and permits the sun full access to the bolls so that they may ripen more rapidly, and loosen and become easier to dislodge and remove.

In picking or gathering cotton, the cotton in each boll individually is contacted and the cotton withdrawn from the boll, leaving the boll on the plant. In harvesting cotton, as heretofore known, it is usual to comb or rake both the bolls and the cotton off and to subsequently separate them during ginning.

The principal object of the present invention is to provide a method of cotton harvesting by agitating the plants and dislodging the cotton from the bolls by such agitation, leaving the major portion of the bolls adhering to the stalk while dislodging substantially all of the cotton lint and seeds therefrom.

A further object of the invention is to provide a method of harvesting cotton by violently agitating the cotton to dislodge the cotton from the bolls.

A further object of the invention is to provide a method of harvesting cotton by agitating the plants to dislodge cotton from the bolls and assisting the dislodging and removing the dislodged cotton to a receptacle by air exhaust means.

A further object of the invention is to provide a method of harvesting cotton by agitating the plants to dislodge cotton from the bolls, retarding and temporarily preventing escape of dislodged cotton and removing the dislodged cotton to a receptacle; and A further object of the invention is to provide a method of harvesting cotton comprising separating the limbs of each cotton plant into groups for successive dislodging action, and then agitating the plants to dislodge cotton from the bolls.

The means by which the foregoing and other objects are accomplished and the manner of their accomplishment will readily be understood from the following specification on reference to the accompanying drawings, in which:

Fig. 1 is a schematic plan view showing the harvester mounted on the forward end of a tractor.

Fig. 2 is a fragmentary similar plan view of a modification of the means for driving the beaters or agitators of the harvester.

Fig. 3 is a fragmentary sectional plan taken as on the line III—III of Fig. 5, showing a modification of the lower portion of the agitator housing.

Fig. 4 is a view of the device taken along line IV—IV of Fig. 7.

Fig. 5 is a fragmentary sectional elevation of the modified form of the device taken on the line V—V of Fig. 3.

Fig. 6 is a sectional side elevation taken on the line VI—VI of Fig. 7; and

Fig. 7 is a view of the device taken along line VII—VII of Fig. 4.

Essentially the harvester comprises a housing from which exhaust flues lead rearwardly to a receptacle or receptacles; the housing encloses beaters or agitators which dislodge the cotton from the bolls, and air flow through the flues assists in the dislodgment of the cotton and accomplishes its transfer to the receptacle.

Referring now to the drawings in which the various parts are indicated by numerals, the harvester housing comprises side walls 12 which depend from opposite sides of a top wall 14, and have attached or integral bottom wall portions 16 and front and rear end wall portions 18 and 20 which extend inwardly from said side walls, but are spaced apart at their inner edges to leave a vertically disposed entrance opening 22 in the front end of the housing for entry of the cotton plants (not shown) into the housing, a similar vertically disposed exit opening 24 for escape of the plants from the housing, and a connection passageway 26 for the passage of the stalks of plants, said front opening 22 being preferably less than one-third the width of the front end of the housing and in any event greatly restricted with respect thereto and to the width of the plants from which the cotton is to be removed.

The housing, around the front and rear openings is preferably reinforced by inverted U-shaped frames 28 and 30 respectively, which frames may be of channel iron. Secured to and extending forwardly from the under and inner sides of the frame 28 and the top and side portions of the front wall around the opening 22, is an approach shield 32 which is arcuate in cross section and extends the full height and around the top of the opening and flares outwardly from the sides and upwardly from the underside of the top of the frame and the opening to guide the plants into the housing. The shield portions on opposite sides of the entrance opening 22 crowd the forwardly extending and some of the diverging limbs of the plant together and direct them through the opening and into the zone of beater attack, and bend back and crowd together laterally extending limbs of the plant for passage into and release within the housing to beater action subsequent to action on the first entering limbs. If the plant be taller than the opening, the top of the plant is bent backward by the top portion of the shield.

The side walls 12 of the housing preferably are secured to and the housing carried by cantilever beams 34 which are attached to and project forwardly from a tractor 36 of well known type, of which the drawings are suggestive only. At its forward end, the housing may also be provided additionally with wheels 38 which are respectively journalled in yokes 40 underlying and pivotally secured to plate-like brackets 42 attached beneath and to the forward ends of the beams 34.

Within a first or forward zone of the housing and adjacent the front end wall portions 18 are a pair of upright, laterally opposite beaters 44 which constitute cotton dislodging means. A similar pair of beaters 46 are disposed in a rear zone of the housing adjacent the rear end wall portions 20, and, if desired, the housing may be made of such a length so as to permit the use of an intermediate pair of beaters 48 between the beaters 44 and 46.

Each beater includes an elongated body which is designated by the beater member and flexibe arms or flails 50, which project laterally from the body and may be of flexible material as rubber, preferably rubber hose. Preferably the proximate portions of the bodies of each pair of beaters are spaced apart as of the nature of the width of the front opening 22, or conversely stated the front opening width is restricted to substantially the spacing of the proximate surfaces of the beater bodies 46. Extending from the upper ends of the beater members are shaft portions 52 which are journalled in bearings 54 carried by the top wall 14 and extend thereabove. Preferably also, shaft portions 56 extend below the beater members and are journalled in bearings 58.

Supported by the top 14, as through members 60, are plates 62 through which the extending shaft portions 52 project for coupling to suitable driving means. The driving means are so rotated or coupled to the beaters that the flails 50 of the rear set of beaters 46 turn inward and forward, whereas the flails of the forward, and preferably of the intermediate beaters also, turn inward and rearward as indicated respectively by the arrows A and B, Fig. 7.

The driving means may comprise, as shown in Figs. 1 and 6, individual motors 64, 66, 68, one for each beater, mounted directly on or coupled to the respective beater shafts; or as shown in Fig. 2, may comprise a motor or pair of motors 68 from which the beaters are driven through belts 70 and 72. If directly driven, as seen in plan Fig. 1, the motors 64 and 68 on the right facing the intake end of the machine turn clockwise and the motor 66 counter-clockwise, while the motors 64 and 68 on the left turn counter-clockwise and the motor 66 clockwise. If driven through belts from the single pair of motors 68 turning similarly clockwise on the right and counter-clockwise on the left, the belts 70 are straight belts and the belts 72 crossed belts.

As shown in Figs. 4, 6 and 7, exhaust fans 74 may be mounted in suitable depressions 76 in the bottom wall portions 16, the depressed walls forming fan housings from which flues 78 lead rearwardly to a suitable receptacle or receptacles (not shown). The fans are preferably directly driven by motors 80 mounted on the bases 76A of the depressions and may be housed by extensions 82 of the housing side walls 12.

Inwardly the adjacent bottom wall portions 16 may be downwardly and inwardly curved transversely to the fore and aft axis of the machine, to form arcuate shields 84 which partially underlie horizontally disposed crowders 86. These crowders comprise elongated body portions, designated by the crowder numeral 86, underlying and extend substantially from the forward beaters 44 to the rearward beaters 46, and have flexible blades 88 of coextensive length, the blades preferably being of rubber, or rubber and fabric, and of width to extend into proximity to the center line of the machine. Shafts 90, 92 extend forwardly and rearwardly from the body portions 86, the shafts 90 being journalled in suitable bearings 94 and the shafts 92 being extensions of, or coupled to, the shafts of motors 96 by which the crowders are driven. Arrows C and D, Fig. 4, indicate respectively the clockwise and counter-clockwise directions in which the right hand and left hand crowders are driven by their motors.

In Figs. 3 and 5, a modification is shown in which the crowder construction above described is omitted and the bottom wall portions 16 of the housing continue inwardly and terminate in serrated edge sections 16A, which are spaced sufficiently to permit the passage of the plant stalks, but compel them to follow an abruptly tortuous path, along which the opposite section edges alternately displace and release the stalk and effect violent agitation of the plant to supplement the agitative action of the beaters. Preferably the serrated edges of the sections are provided with flanges 16B, Fig. 5, which minimize cutting of the plant stalks.

Removal of the cotton may be effected as before described or the bottom wall portions may be provided with converging depressions 98 from which rearwardly extending flues 100 lead to and through exhaust means (not shown).

Preferably the motors herein described are energized by a generator 102, mounted on the tractor 36 and driven from the usual power take-off 104, of such tractor, through a suitable power cable 106, provided with a cut-off switch 108, and suitable branch cables to the various motors.

Pickup gatherers 110 are preferably provided which are secured to the front walls 18 on opposite sides of the entrance opening 22 and flare outwardly and extend downwardly forward thereof.

It will be understood that much of the detail herein shown is suggestive only and except where specifically set out in a claim, such detail shall not be implied.

It will particularly be understood that parts such as the tractor, the motors, the generator, and the exhaust fans are indicative only of such devices purchased on the open market.

It will be understood also that the spacing and flexibility of the flails will permit them to pass around and between unopened bolls, should such bolls exist, without combing or stripping action thereon.

In use, as the harvester is advanced toward the cotton plants (not shown) those limbs of the plant which are in line with the entrance opening 22 enter the opening and some additional limbs diverging from, these limbs are crowded together and make up a group comprising usually some one-third of the limbs of the plant which enter the forward zone of the housing and pass between the beaters. During action on this group more widely diverging or laterally extending limbs are bent backward and retarded and singly released forming a second group which passes the entrance and to the beaters in the forward zone, the limbs of this group as they pass through the opening tending to spring apart and forwardly away from the following limbs, and following this group is the third group of limbs pointing away from the opening and less severely crowded, the separation into groups greatly aiding access of the beater flails to the bolls.

The pair of beaters in the forward zone adjacent the entrance end of the housing are so driven that the flails adjacent the entrance end of the housing move toward the center longitudinally of the housing and then away from the entrance end and tend to whip the cotton from the bolls and as well to draw the plants in through the entrance opening and to maintain to some extent a crowding of the first group of limbs, an attack on the lateral limbs of the second group more or less singly and an attack opening up limbs of the third group.

The pair of beaters in the rear zone adjacent the exit end of the housing are oppositely driven and attack and open up the limbs of the first group, singly attack the limbs of the second group and crowd together the limbs of the third group.

In operation, the harvester is pushed forward along the rows of cotton successively, with the housing astride a row. As the housing is advanced the converging sides of the pickup gatherers 110 direct the stalks of the plant toward the front opening 22 of the housing and bend the lower limbs of the plant upward as the opening in the housing approaches the stalk. The approach shield 32 contacts these limbs, and bends them with the limbs thereabove upward and pushes them together to pass through the opening into the forward zone. Within the housing the flails 50 of the beaters 44 adjacent the front of the housing laterally beat against and violently agitate these limbs and the bolls thereon. This beating action and agitation is continued by the flails of the intermediate beaters 48, if there be such intermediate beaters, and by the flails of the rear set of beaters 46 in the rear zone, which latter beaters being turned in opposing directions to the relative movement of the plants theretoward, oppositely attack and agitate them to complete dislodgment of any remaining cotton. It will be appreciated that the flails are relatively much heavier than the limbs and bolls of the plant, and that they are driven, as is indicated by showing the motors directly connected thereto, at a high rate of speed so that the action is a violent one. This action is resisted by the inertia of the locks of cotton, which, although the lint is light in the bolls, is in a more or less compact mass, with the lint wrapped around the seed which are about twice as heavy as the lint therearound, and establish sufficient mass and weight to effect by inertia their dislodgment from the bolls. Additionally, these agitating and dislodging actions are supplemented by exhaust flow of air toward the suction fans 74.

During the passing of the plants through the housing downward escape of the released cotton through such opening as exists at the bottom of the housing is resisted by the blades 88 of the crowders 86 and agitation of the plants is augmented by the beating action of these blades. Substantially all of the cotton is shaken and withdrawn from the bolls by the combined agitating action of the beaters and crowders and the suction action of the fans, which fans discharge the dislodged cotton through the flues 78 to the receptacles (not shown) provided therefor.

In the modified form of the machine shown in Figs. 3 and 5, the entrance movements and beater action, as the plants approach and pass through the housing, is unchanged from that above described. During the passage of the cotton through the housing, however, the stalks of the plants are violently bumped from side to side by the serrated edges of the bottom wall of the housing and additional agitation thereby set up to assist in dislodging the cotton from the bolls, and as before the suction currents of air through the flues 100 materially assist in the dislodging action, and accomplish removal of the dislodged cotton through the flues for subsequent disposal.

Attention is called to the length of the housing particularly related to the diameters of the beaters.

Further attention is called to the spacing of the beaters made possible by this elongation of the housing and the spaces or intermediate zone thereby set up between the beaters, in which spaces it is possible for the limbs of the plants to straighten out after passing the entrance set of beaters, and the center set, if such set be used, opening up the plant and allowing action of the exhaust air currents to extend into the plants and remove cotton loosened from the bolls, but more or less trapped by crowding action of the beaters while such beating is going on.

It will be noted also that limbs at the front of the plants are bent inward and forward and bunched by the approach portions to pass through the entrance opening, whereas those toward the center and back portions of the plant are bent backward and bunched, permitting two separate actions by the beaters on each plant, greatly facilitating the actions.

We claim:

1. The method of harvesting cotton which comprises the steps of successively confining and compressing the cotton boll-carrying limbs of a row of cotton plants, separating said limbs into groups, progressing said limb groups successively into a first beating zone, sequentially subjecting said limb groups to mass beating action in one direction in said first zone while maintaining limb compression to assist limb group progression through said first zone and to violently agitate said limbs and dislodge cotton from bolls on said limbs, progressing said limbs beyond said first zone to an intermediate zone, releasing said limb compression to expand said limbs and release dislodged cotton from bolls on said limbs, continuing progression of said limb groups to a second beating zone beyond said intermediate zone, said second beating zone being spaced from said first beating zone a distance greater than a distance of the nature of the width of a mature cotton plant, subjecting said limb groups to mass beating action in an opposite direction to oppose limb group progression out of said intermediate zone and additionally dislodge cotton from bolls on said limbs, establishing suction air flow through said intermediate zone in a direction intersecting the path of limb progression, to additionally agitate said limbs and remove dislodged cotton from said intermediate zone.

2. The method of harvesting cotton which comprises the steps of successively compressing the cotton-boll-carrying limbs of a row of cotton plants, separating said limbs into groups, progressing said limb groups successively into a first beating zone, sequentially subjecting said limb groups to mass beating action in one direction in said first zone while maintaining limb compression to assist limb group progression through said first zone and to violently agitate said limbs and dislodge cotton from bolls on said limbs, progressing said limbs beyond said first zone to an intermediate zone releasing said limb compression to expand said limbs and release dislodged cotton from bolls on said limbs, continuing progression of said limb groups to a second beating zone beyond intermediate zone, said second beating zone being spaced from said first beating zone a distance greater than a distance of the nature of the width of a mature cotton plant, subjecting said limb groups to mass beating action in an opposite direction to oppose limb group progression out of said intermediate zone and additionally dislodge cotton from bolls on said limbs, and removing dislodged cotton from said intermediate zone.

3. The method of harvesting cotton which comprises the steps of successively compressing the cotton-boll-carrying limbs of a row of cotton plants, progressing said limbs successively into a first beating zone, sequentially subjecting said limbs to mass beating action in one direction in said first zone while maintaining limb compression to assist limb progression through said first zone and to violently agitate said limbs and dislodge cotton from bolls on said limbs, progressing said limbs beyond said first zone to an intermediate zone releasing said limb compression to expand said limbs and release dislodged cotton from bolls on said limbs, continuing progression of said limbs to a second beating zone beyond said intermediate zone, said second beating zone being spaced from said first beating zone a distance greater than a distance of the nature of the width of a mature cotton plant, subjecting said limbs to mass beating action in an opposite direction to oppose limb progression out of said intermediate zone and additionally dislodge cotton from bolls on said limbs, and removing dislodged cotton from said intermediate zone.

4. The method of harvesting cotton from a row of cotton plants which comprises the steps of encasing a cotton plant, relatively progressing said plant while encased, subjecting said plant in a first portion of its progress to a rotary beating action violently agitating said plant and assisting relative progress of the beaten plant in the direction of beating rotation, interrupting beating agitation of said plant for release of dislodged cotton, subjecting said plant to suction air flow while beating of said plant is interrupted, subsequently subjecting said plant to additional rotary beating action in a direction opposite to the first mentioned rotary beating action, said additional beating action resisting progress of said plant and reversely violently agitating said plant, freeing said plant from encasing, and sequentially identically treating additional plants in said row, dislodged cotton being withdrawn by the action of said suction air flow.

5. The method of harvesting cotton from a row of cotton plants which comprises the steps of encasing a cotton plant, relatively progressing said plant while encased, subjecting said plant in a first portion of its progress to a rotary beating action violently agitating said plant and assisting relative progress of the beaten plant in the direction of beating action, subsequently subjecting said plant while encased to additional beating action in a direction opposite to the first mentioned beating action, said additional beating action resisting progress of said plant and reversely violently agitating said plant, freeing said plant from encasing, sequentially identically treating additional plants in said row, and withdrawing dislodged cotton during the first said beating and sequential treatments.

References Cited in the file of this patent

UNITED STATES PATENTS

| | | |
|---|---|---|
| 1,400,522 | Cannon | Dec. 20, 1921 |
| 1,713,397 | Rountree | May 14, 1929 |
| 2,489,963 | Henley | Nov. 29, 1949 |
| 2,514,898 | Ramsy | July 11, 1950 |
| 2,634,570 | Brockmar et al. | Apr. 14, 1953 |